Patented Dec. 11, 1934

1,984,094

UNITED STATES PATENT OFFICE 1,984,094

PREPARATION OF BENZYL ESTERS OF CELLULOSE ACETATE PHTHALATE

Cyril J. Staud and William O. Kenyon, Rochester, N. Y., assignors to Eastman Kodak Company, Rochester, N. Y., a corporation of New York No Drawing. Application April 27, 1932, Serial No. 607,883

14 Claims. (Cl. 260—101)

The present invention relates to the benzyl esters of cellulose acetate phthalate and their preparation by reacting upon cellulose acetate phthalate with a benzyl halide in the presence of an organic base such as pyridine.

The phthalic esters of cellulose were first mentioned in an article on "Cellulose phthalate: its preparation and properties" by H. A. Levey in the "Journal of Industrial and Engineering Chemistry" of August 1920. This article discloses that the research on the preparation of phthalic acid esters of cellulose was carried out at a time when the ordinary solvents employed for cellulose acetate, for example acetone, could not very well be spared for that purpose due to their importance in the preparation of explosives. Consequently it was important that an ester of cellulose be prepared which would require a solvent or mixture of solvents in less demand at that time. Levey therefore worked out a method of preparing phthalic esters of cellulose but upon their completion these esters were not only found to be insoluble in acetone, chloroform, ethylacetate, benzene, carbon tetrachlorid, toluene, pyridine, acetic acid, the xylenes, tetrachlorethane, aniline, ether, nitrobenzene and diethyl phthalate alone but also in their mixtures with alcohol.

Levey prepared his phthalic esters of cellulose by treating a modified cellulose with phthalic anhydrid in the presence of fused zinc chloride as a catalyst. He was able by that process to unite only one molecule of phthalic acid with 8 molecules of cellulose figured as $C_6H_{10}O_5$.

Malm and Waring as disclosed in their application Serial No. 380,252 found that by carrying out the esterification process in the presence of an organic base such as pyridine that the cellulose molecule was much more susceptible to the introduction of phthalic acid groups. The products resulting from that process were soluble in various solvents such as a mixture of pyridine and tetrachlorethane from which solutions they could be coated out to form films or coagulated in heated air or a non-solvent.

One object of our invention is to prepare a cellulose ester containing phthalic acid groups. Another object of our invention is to prepare a cellulose ester containing phthalyl acid radicals which is soluble in a solvent mixture composed of acetone and alcohol. A further object of our invention is to prepare a benzyl ester of cellulose acetate phthalate. Other objects will hereinafter appear.

We have found that if a cellulose acetate phthalate or a salt thereof is treated with benzyl chlorid in the presence of pyridine a cellulose ester forms which is soluble in various solvent combinations such for example as chloroform-alcohol, and acetone-alcohol and which is resistant to solution by aqueous alkalies. It is believed that in the case of cellulose acetate phthalate only one of the carboxyl groups is attached to the cellulose molecule and that the other carboxyl group of the phthalic acid remains as such. What is thought to occur in our process is that the free carboxyl group reacts with the benzyl chloride to form the benzyl ester of the cellulose acetate phthalate. This reaction may be represented as follows:

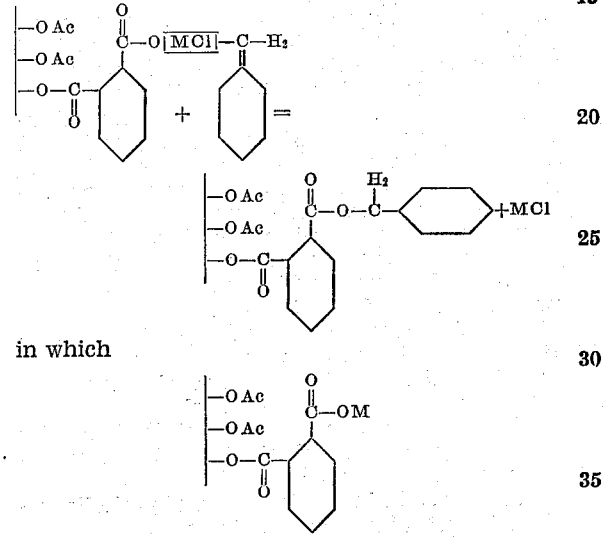

in which represents a molecule of cellulose acetate phthalate or its metallic salt based on $C_6H_{10}O_5$ as representing a unit of cellulose. In the above M may represent Na, H, K or some other monovalent basic atom or radical or the monovalent portion of some polyvalent basic atom or radical. However, it is preferred that M be either a hydrogen or alkali metal atom in the formula as these compounds have been found to be quite satisfactory. It is to be understood that the above representation is theoretical and is inserted to make clear what is believed to take place in the process of our invention. It is to be understood that the term "represented" or "represented by" as used in this application referring to the structural formula of a compound implies that the structural formula referred to is only a representation of the compound and does not limit it as to the proportions of the various radicals or groups which may be found therein, especially as regards the compounds of cellulose. In view of what apparently takes place in our process, the products resulting therefrom will be referred to herein as benzyl esters of cellulose acetate phthalate. In the above representation two acetyl and one phthalyl group are attached to the cellulose based on $C_6H_{10}O_5$. The use of this proportion of acyl groups in the equation is merely illustrative and for purposes of simplicity. Obviously the acetyl and phthalyl groups may be present in the cellulose acetate phthalate in varied proportions or ratios.

The following examples are illustrative of the carrying out of processes according to our invention:

Example I

About 25 lbs. of a cellulose acetate-phthalate having a 27% phthalyl content was treated with 127 lbs. of benzyl chloride and 250 lbs. of pyridine. The mixture formed was maintained at a temperature of about 100° C. for approximately 22 hrs. and the ester formed thereby was precipitated from the mass by pouring it into water. It was then washed with dilute acetic acid and then successively with water until when drained off and tested with an indicator such as bromphenol blue it showed neutrality. The product thus obtained was brown but became white on drying at 105° C.

Example II

About 50 lbs. of a cellulose acetate phthalate such as employed in Example I was dissolved in pyridine. Aqueous sodium hydroxide was added to the point of slight alkalinity which may be determined by testing with an indicator such as phenolphthalein. About 385 lbs. of benzyl chlorid was then mixed in and the mass was heated in a jacketed vessel by means of steam for approximately 5 hours. The ester formed was precipitated by pouring into water, was washed with water and without drying was dissolved in acetone. This acetone solution was precipitated in hot water forming a while fluffy product. This product was dried at a temperature of 105° C.

The ester formed by the process of our invention was found to be soluble in chloroform-alcohol and in acetone-alcohol. It was also found to soften or swell in benzene-alcohol.

We have found the cellulose acetate phthalates prepared according to the Malm and Waring application Serial No. 380,252 in which cellulose acetate is reacted upon by means of phthalic anhydride and a tertiary organic base are particularly adapted as the starting material for use in our invention. Obviously other esters of cellulose containing phthalyl groups which possess a free carboxyl or equivalent group may be employed as a starting material in our invention.

Other benzyl halides such as benzyl bromide may be employed in the process of our invention instead of benzyl chloride however the use of the latter compound is preferred as it is more common and inexpensive than the other benzyl halide compounds and has been found to be satisfactory for the purpose.

Also other organic bases than pyridine such as alphapicoline, quinoline and especially those organic bases which may be regarded as derivatives of pyridine may be employed in carrying out our invention.

The ester formed according to our invention may be coated out from its solution for example in acetone-alcohol to form a skin or sheet of the ester. If desired the ester may be filamented from its solution into heated air or into a liquid coagulating bath. Various other uses such as in lacquer or molding compositions etc. at once suggest themselves for the cellulose compound produced according to our invention.

Where the term "derivative of pyridine" is used herein it is also to be understood as including pyridine itself.

We claim as our invention:

1. The process of preparing a benzyl ester of a cellulose derivative containing a phthalyl group in which group there is a carboxyl group which is either free or combined with a monovalent base which comprises reacting upon the derivative with a benzyl halide in the presence of a tertiary heterocyclic nitrogen base.

2. The process of preparing a benzyl ester of a cellulose derivative represented by the formula

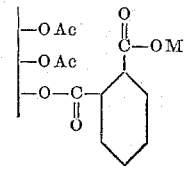

(based on $C_6H_{10}O_5$ as representing a unit of cellulose in which M represents a monovalent basic radical or atom or the monovalent portion of some polyvalent basic atom or radical) which comprises reacting upon the derivative with a benzyl halide in the presence of a tertiary heterocyclic nitrogen base.

3. The process of preparing a benzyl ester of cellulose acetate-phthalate the phthalyl of which contains a carboxyl which is either free or combined with the monovalent base which comprises reacting upon the acetate-phthalate with a benzyl halide in the presence of a tertiary heterocyclic nitrogen base.

4. The process of preparing a benzyl ester of a cellulose derivative containing a phthalyl group in which group there is a carboxyl group which is either free or combined with a monovalent base which comprises reacting upon the derivative with benzyl chloride.

5. The process of preparing a benzyl ester of cellulose acetate-phthalate the phthalyl of which contains a carboxyl which is either free or combined with the monovalent base which comprises reacting upon the acetate-phthalate with benzyl chloride in the presence of a tertiary heterocyclic nitrogen base.

6. The process of preparing a benzyl ester of a cellulose derivative containing a phthalyl group in which group there is a carboxyl group which is either free or combined with a monovalent base which comprises reacting upon the derivative with a benzyl halide in the presence of a base selected from the group consisting of pyridine, its homologues and analogues.

7. The process of preparing a benzyl ester of cellulose acetate-phthalate the phthalyl of which contains a carboxyl which is either free or combined with the monovalent base which comprises reacting upon the acetate-phthalate with a benzyl halide in the presence of a base selected from the group consisting of pyridine, its homologues and analogues.

8. The process of preparing a benzyl ester of cellulose acetate-phthalate the phthalyl of which contains a carboxyl which is either free or combined with the monovalent base which comprises reacting upon the acetate phthalate with benzyl chloride in the presence of a base selected from the group consisting of pyridine, its homologues and analogues.

9. The process of preparing a benzyl ester of cellulose acetate-phthalate the phthalyl of which contains a carboxyl which is either free or combined with the monovalent base which comprises reacting upon the acetate-phthalate with a benzyl halide in the presence of pyridine.

10. The process of preparing a benzyl ester of cellulose acetate-phthalate the phthalyl of which contains a carboxyl which is either free or combined with the monovalent base which comprises reacting upon the acetate-phthalate with benzyl chloride in the presence of pyridine.

11. The process of preparing a benzyl ester of a cellulose derivative containing a phthalyl group in which group there is a carboxyl group which is either free or combined with a monovalent base which comprises reacting upon the derivative with a benzyl halide in the presence of pyridine.

12. The process of preparing a benzyl ester of a cellulose derivative containing a phthalyl group in which group there is a carboxyl group which is either free or combined with a monovalent base which comprises reacting upon the derivative with benzyl chloride in the presence of pyridine.

13. The process of preparing a benzyl ester of cellulose acetate phthalate which comprises reacting upon an alkali metal salt of cellulose acetate-phthalate with a benzyl halide in the presence of a base selected from the group consisting of pyridine, its homologues and analogues.

14. The process of preparing a benzyl ester of cellulose acetate phthalate which comprises reacting upon a sodium salt of cellulose acetate-phthalate with a benzyl halide in the presence of a base selected from the group consisting of pyridine, its homologues and analogues.

CYRIL J. STAUD.
WILLIAM O. KENYON.